United States Patent [19]
Ito

[11] Patent Number: 5,216,348
[45] Date of Patent: Jun. 1, 1993

[54] METHOD OF CONTROLLING A STEPPING MOTOR AND DRIVE CIRCUIT EMPLOYING THE SAME

[75] Inventor: Toshikazu Ito, Tokyo, Japan

[73] Assignee: Oki Electric Industry Co., Ltd., Tokyo, Japan

[21] Appl. No.: 704,057

[22] Filed: May 22, 1991

[30] Foreign Application Priority Data

May 22, 1990 [JP] Japan .................................. 2-130390

[51] Int. Cl.⁵ .............................................. H02P 8/00
[52] U.S. Cl. ...................................... 318/696; 318/41
[58] Field of Search ................... 318/696, 685; 363/41

[56] References Cited

U.S. PATENT DOCUMENTS

| | | | |
|---|---|---|---|
| 3,972,535 | 8/1976 | Bleiman | 318/696 |
| 4,157,647 | 6/1979 | Takahashi et al. | 318/696 |
| 4,293,807 | 10/1981 | Foster et al. | 318/696 |
| 4,353,021 | 10/1982 | Watanabe et al. | 318/696 |
| 4,757,245 | 7/1988 | Ayers et al. | 318/696 |
| 4,769,585 | 9/1988 | Tanuma et al. | 318/696 |
| 4,933,619 | 6/1990 | Chang | 318/696 |

Primary Examiner—William M. Shoop, Jr.
Assistant Examiner—Karen Masih
Attorney, Agent, or Firm—Edward D. Manzo; David K. Lucente

[57] ABSTRACT

A method of controlling a stepping motor for supplying a drive current to each of the phase windings thereof in response to control signals. The control signals are formed by combining logically phase exciting signals and overdrive signals in synchronization with a clock pulse signal. Each of the overdrive signals also includes a pulse with a longer width at an earlier stage of a phase exciting duration during which a drive current flows in the stepping motor and a pulse with a shorter width at a later stage of the phase exciting duration. Hence, a small drive current flows in the phase windings after a later stage of the exciting duration, thus reducing power consumption.

20 Claims, 7 Drawing Sheets

METHOD OF CONTROLLING A STEPPING MOTOR AND DRIVE CIRCUIT EMPLOYING THE SAME

BACKGROUND OF THE INVENTION

1. Field of the Invention

The present invention relates to a method of controlling an overdrive type stepping motor and a drive circuit employing the same method.

2. Description of the Related Art

In the case of driving a stepping motor requiring high holding torque, a high voltage is applied to the phase windings of a stepping motor to reduce the rise time of an exciting or driving current supplied to the phase windings. In this case, the high voltage needs to be changed to a low voltage or cut off when the motor reaches a given position to prevent overheating of the stepping motor caused by the supply of overcurrent to the phase windings. Therefore, the driving current supplied to the phase windings must be suppressed.

The conventional method of controlling an overdrive type stepping motor will be described with reference to FIGS. 9 and 10. FIG. 9 is the drive circuit and FIG. 10 is a timing chart showing the operation of that circuit.

The drive circuit of FIG. 9 comprises a pulse generator 1 for generating a chain of pulses, an overdrive signal generator 2 for generating overdrive signals upon reception of the pulses, a distributing circuit 3 for producing exciting signals, transistors 4a to 4d for receiving phase exciting signals, a transistor 4e for receiving a power source voltage +E1 and phase windings 5a to 5d of a stepping motor.

The drive circuit starts operation when the pulse generator 1 produces the pulse signal (a) as illustrated in FIG. 10. An overdrive signal (b) is produced by the overdrive signal generator 2 upon reception of the pulse signal (a). The overdrive signal (b) goes high, thereby turning on the transistor, by way of a transistor 4f for a given time so that the power supply voltage +E1 is supplied to the phase windings 5a to 5d.

The distributing circuit 3 selectively produces exciting signals (c) to (f) upon reception of the pulse signal (a), thereby turning on or off the transistors 4a to 4d in a given sequence so that the driving current is supplied to the phase windings 5a to 5d a discrete combination of two phases.

If the stepping motor is the one-two alternating phase exciting type, in which the exciting or driving current is supplied alternately to the one phase winding or the two phase windings of the stepping motor, the exciting signals (c) to (f) as illustrated in FIG. 10 are supplied from the distributing circuit 3 to the transistors 4a to 4d so that the driving currents are supplied to the phase windings 5a to 5d in the directions of the arrows denoted at i1 to i4 in FIG. 9, thereby rotating the stepping motor.

A cyclic change of the pulse signal (a) produced by the pulse generator 1 influences the speed of revolution of the stepping motor. A change of the pulse width of the overdrive signal (b) produced by the overdrive signal generator 2 influences the magnitude of the driving current.

However, when the stepping motor is used to its performance limit in accordance with the above-mentioned stepping motor controlling method, the phase winding current rises up sharply at the trailing edge of the excitation due to a magnetic saturation, as shown in the broken lines in FIG. 10, thus resulting in large amount of heat from the stepping motor. If, in order to overcome this problem, the width of the overdrive signal (b), is shortened enough current cannot be supplied at the rising edge of the phase excitation. Thus, the motor torque is decreased.

If the source voltage +E1 is high and unstable, the driving current is excessively supplied to the phase windings, thereby heating the motor. If the power source voltage +E1 is low, the driving current does not sufficiently to supply the phase windings, thereby reducing the torque. To cope with this problem, a chopper type constant current drive circuit may be employed, but it will cause high manufacturing cost.

SUMMARY OF THE INVENTION

The present invention solves the problems of the conventional method of controlling a stepping motor. It provides a method of controlling a stepping motor which is capable of eliminating the generation of the overcurrent, the torque reduction and the increased manufacturing cost even if the stepping motor operates at its maximum performance.

It is therefore an object of the present invention to provide a method of controlling a stepping motor by producing a plurality of control signals by combining selectively a plurality of overdrive signals and a plurality of exciting signals. Each of said plurality of overdrive signals being formed of a pulse with a longer width at an earlier stage of a phase exciting duration during which a drive current flows in the stepping motor and a pulse with a shorter pulse width at a later stage of said phase exciting duration. A drive current is supplied to the stepping motor during the phase exciting duration in response to a control signal.

It is another object of the present invention to provide a method of controlling a stepping motor by producing a plurality of overdrive signals, each of the plurality of overdrive signals being formed of a pulse with a longer width at an earlier stage of a phase exciting duration during which a drive current flows in the stepping motor and a pulse with a shorter pulse width at a later stage of the phase exciting duration. A drive current is supplied to the stepping motor during the phase exciting duration in response to the overdrive signals.

The pulse widths of the overdrive signals are compensated in accordance with the magnitude of the power supply voltage applied to the windings of the stepping motor. That is, the pulse width of the overdrive signal is short if the power voltage is high while it is long if the power voltage is low.

The pulse widths of the overdrive signals are compensated in accordance with the speed of revolution of the stepping motor. That is, the pulse width of the overdrive signal is short if the speed of revolution is high while it is long if the speed of revolution is low.

With the arrangement of the drive circuit set forth above, it is possible to supply the drive current sufficiently to each of the phase windings at the rise time and to reduce the drive current after the rise time.

Furthermore, it is possible to prevent a drive current from being excessively supplied to the phase windings by shortening the pulse width when the power voltage or the speed of revolution is high and to assure the drive current by lengthening the pulse width when the power voltage or the speed of revolution is low by the operation of the compensating circuit.

DESCRIPTION OF THE PREFERRED EMBODIMENT

First Embodiment (FIGS. 1 to 4)

A bipolar stepping motor controlling method according to a first embodiment of the present invention will be described with reference to FIGS. 1 to 4.

Figure 1:
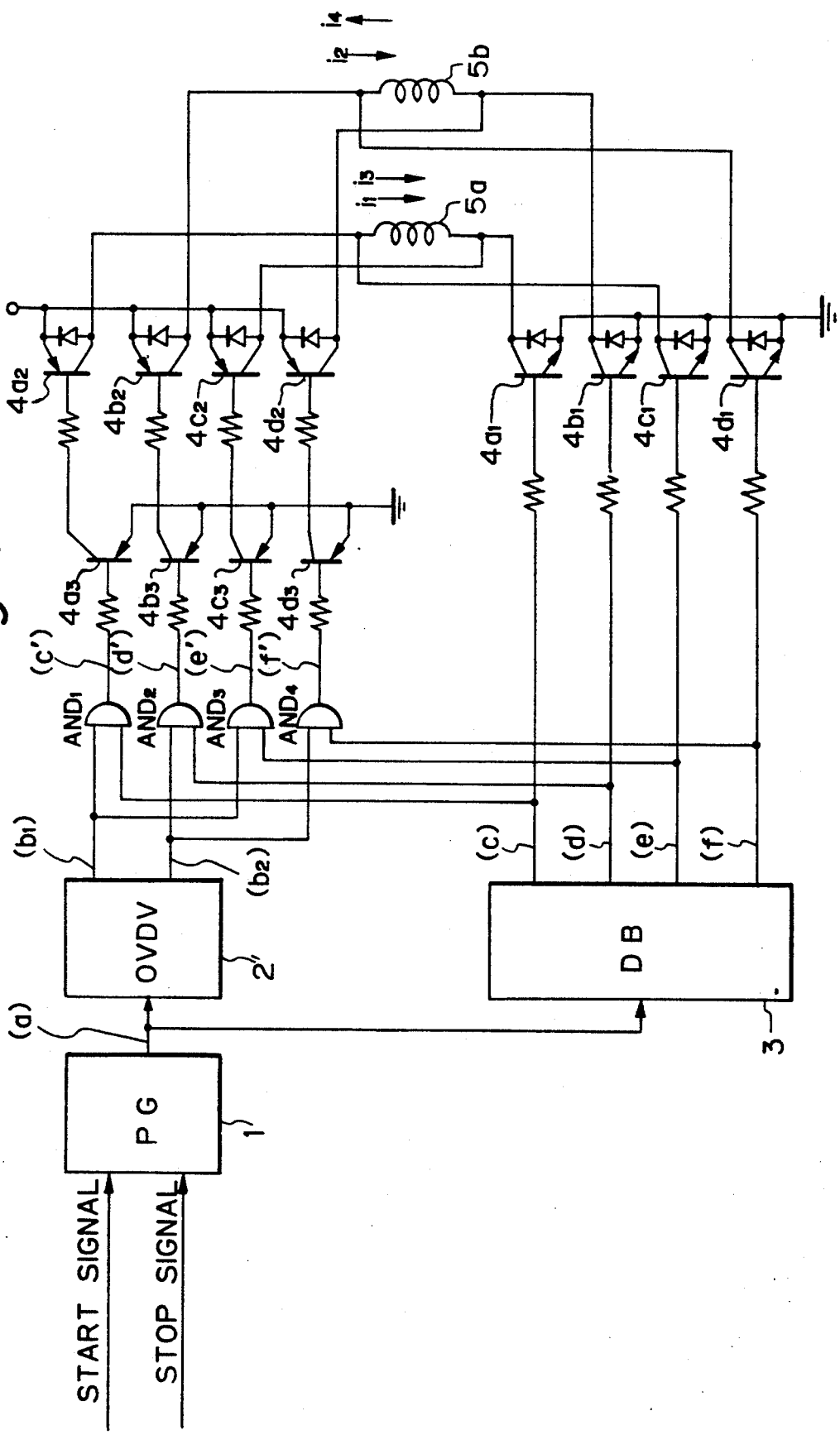
FIG. 1 is a circuit diagram of a drive circuit for a stepping motor according to a first embodiment of the present invention.
Figure 2:
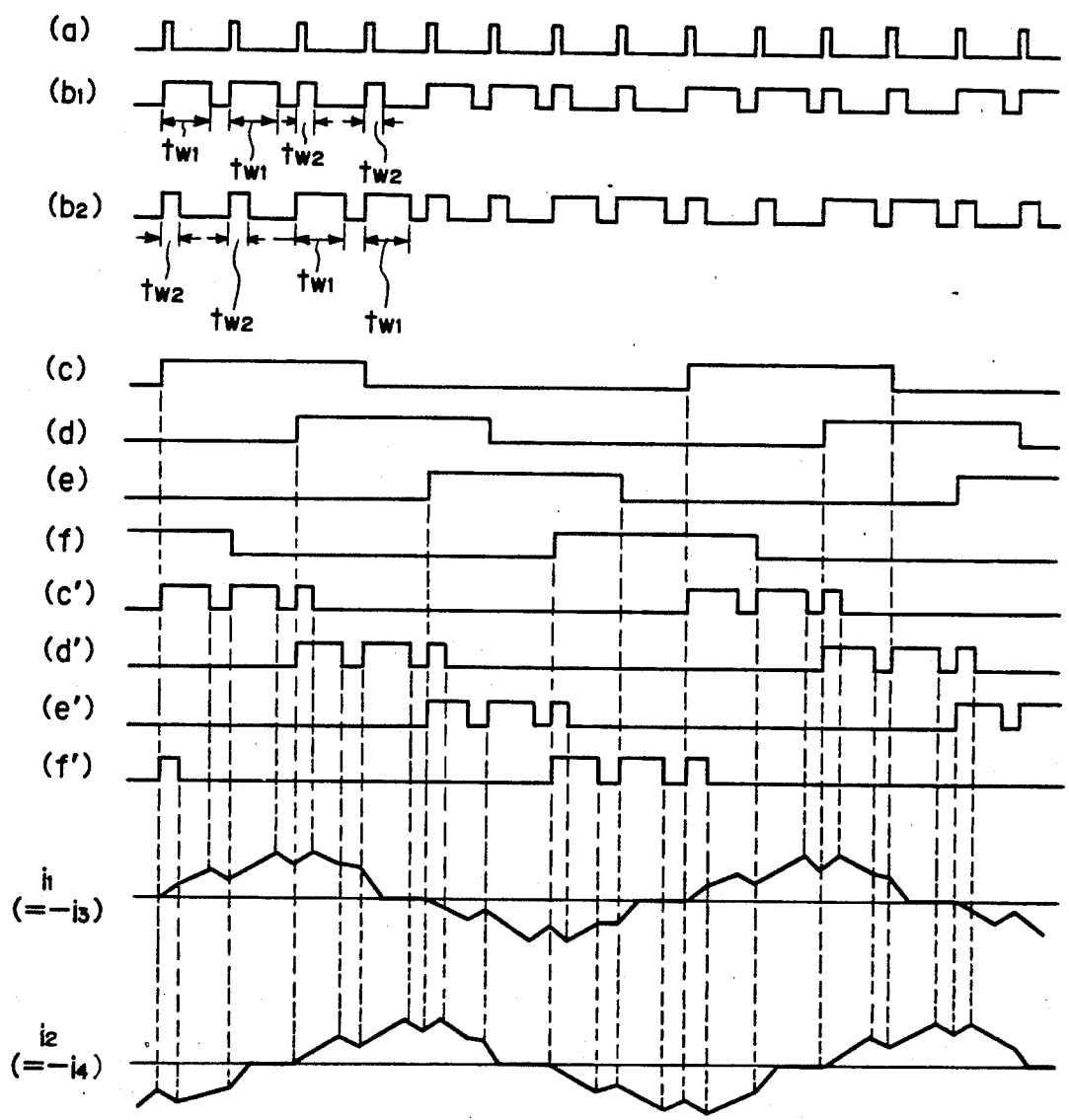
FIG. 2 is a timing chart showing an operation of the circuit of FIG. 1.

A drive circuit for controlling the stepping motor comprises, as illustrated in FIG. 1, a pulse generator 1 for receiving a start signal and producing a chain of pulse signals, an overdrive signal generator 2' for receiving the pulse signal from the pulse generator 1 and producing the overdrive signals, a distributing circuit 3 for receiving the pulse signal from the pulse generator 1 and producing the phase exciting signals, AND gates AND1 to AND4 each receiving an overdrive signal from the overdrive signal generator 2' at one input terminal and a phase exciting signal from the distributing circuit 3 at the other input terminal for carrying out the logical AND between the overdrive signals and the phase exciting signals which then generates the control signals (c') to (f') for turning on transistors 4a2 to 4d2 by way of transistors 4a3 to 4d3 for a given time and in a given sequence, transistors 4a1 to 4d1 are coupled to receive the phase exciting signals, transistors 4a2 to 4d2 are coupled to selectively receive a power source voltage +E1 and phase windings 5a and 5b of the bipolar stepping motor. When the transistors 4a1 and 4a2 are turned on, the power voltage +E1 is supplied to the phase winding 5a so that an exciting current flows in the direction of i1. When the transistors 4c1 and 4c2 are turned on the exciting current flows to the phase winding 5a in the direction of i3. Likewise, when the transistors 4b1 and 4b2 are turned on, the exciting current flows to the phase winding 5b in the direction of i2. And, when the transistors 4d1 and 4d2 are turned on, the exciting current flows to the phase winding 5b in the direction of i4.

The drive circuit for the bipolar stepping motor starts operation when the pulse generator 1 produces the pulse signal (a) upon reception of the start signal. That is, when the bipolar stepping motor is driven by a one-two alternate phase exciting system, the pulse signal (a) is supplied to the distributing circuit 3 which then selectively produces phase exciting signals (c) to (f) that are coupled to the transistors 4a1 to 4d1, thereby turning them on in a given sequence.

The overdrive signals (b1) and (b2) are produced by the overdrive signal generator 2' when it receives the pulse signal (a) from the pulse generator 1. The AND circuits carry out the logical AND between the overdrive signals (b1) and (b2) and the phase exciting signals (c) to (f) and produce the control signals (c') to (f') which are coupled to the transistors 4a2 to 4d2 by way of the transistors 4a3 to 4d3. As a result, the transistors 4a2 to 4d2 are turned on for a given time in a given sequence, thereby supplying the power source voltage +E1 to the phase windings 5a and 5b so that the forward or reverse exciting current flowing from the power source voltage +E1 to the ground.

The overdrive signal (b1) produced by the overdrive signal generator 2' is high at the first two pulses for a duration of $t_{w1}$ and the next two pulses for a duration of $t_{w2}$ when the phase exciting signals (c) and (e) are high (phase exciting duration). Subsequently, the control signals (c') and (e') produced by AND1 and AND3 go high at the first two pulses for the duration of $t_{w1}$ and at a next pulse for the duration of $t_{w2}$ during which the transistors 4a2 and 4c2 are turned on and the power supply voltage +E1 is supplied to the phase winding 5a.

Likewise, the overdrive signal (b2) goes to high level at the first two pulses for a duration of $t_{w1}$ and at the next two pulses for a duration of $t_{w2}$ in response to the duration where the phase exciting signals (d) and (f) are high (phase exciting duration). The control signals (d') and (f') produced by AND2 and AND4 go high at the first two pulses for the duration of $t_{w1}$ and at a next pulse for the duration of $t_{w2}$ during which the transistors 4b2 and 4d2 are turned on so that the power source voltage +E1 is supplied to the phase winding 5b. As a result, the exciting or driving current is supplied to the phase winding 5a and 5b in the forward or reverse direction as illustrated by the arrows in FIG. 2 so that the stepping motor starts rotating.

The expression of $t_{w1} > t_{w2}$ is established between the durations $t_{w1}$ and $t_{w2}$ of the overdrive signals The duration $t_{w1}$ is determined so that the current is sufficiently supplied at the leading edge of the exciting current while the duration $t_{w2}$ is determined so that the current does not rise sharp at the trailing edge of the exciting current, thus preventing the reduction of the torque caused by the overheating of the stepping motor.

Figure 3:
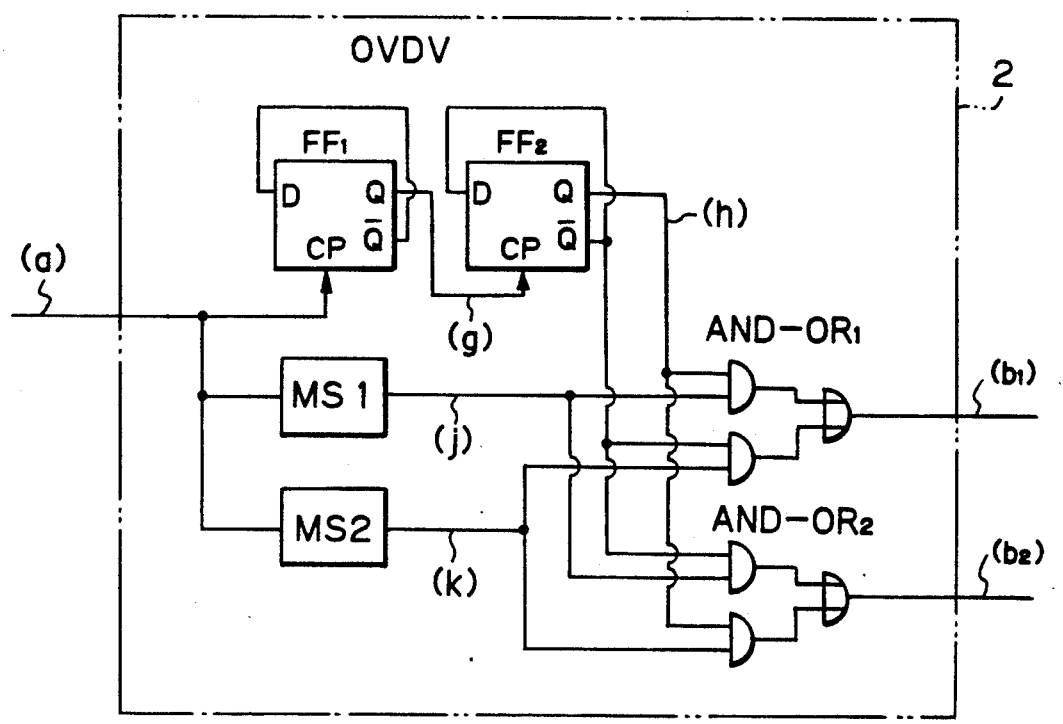
FIG. 3 is a circuit diagram of an overdrive signal generator employed in the drive circuit of FIG. 1.
Figure 4:
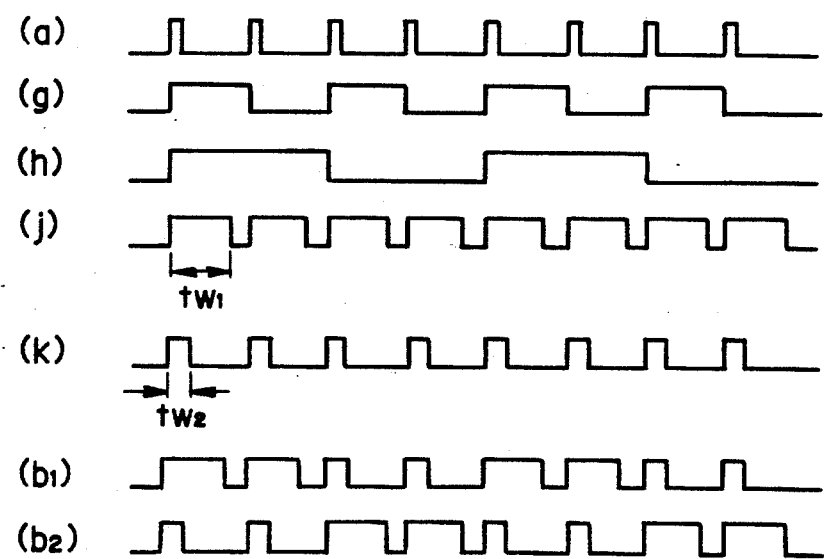
FIG. 4 is a timing chart showing an operation of the circuit of FIG. 3.

The overdrive signal generator 2' will be described in more detail with reference to FIGS. 3 and 4. The overdrive signal generator 2' comprises D-type flip-flops FF1 and FF2 serving as a mod-4 counter for counting the pulse signal (a) each time the flip-flop FF1 receives the pulse signal (a) and producing output signals (g) and (h). The one-shot multivibrators MS1 and MS2 are for producing output signals (j) and (k) of H level for a duration of $t_{w1}$ and a duration of $t_{w2}$ respectively each time they receive the pulse signal (a) from the pulse generator 1. AND-OR circuits AND-OR1 and AND-OR2 are for switching the output signals (j) and (k) from the one-shot multivibrators MS1 and MS2, depending on the output signal (h) from the flip-flop FF2 to produce the overdrive signals (b1) and (b2). That is, the overdrive signal (b1) is composed of the produce. The output signal (j) having a pulse width $t_{w1}$ when the output signal (h) of the flip-flop FF2 is high and the output signal (k) having the pulse width $t_{w2}$ when the output signal (h) of the flip-flop FF2 is low. The overdrive signal (b2) is produced by the output signal (k) having the pulse width $t_{w2}$, when the output signal (h) of the flip-flop FF2 is high and the output signal (j) having the pulse width $t_{w1}$ when the output signal (h) of the flip-flop FF2 is low.

In such a manner, as shown in FIG. (2), an overdrive signal (b1) and an overdrive signal (b2) are output from the overdrive signal generator 2'. The overdrive signal (b2) being shifted out by phase of 90 degrees with respect to the overdrive signal (b1) during the phase exciting period. Then, phase signals (c'), (d'), (e'), (f') are produced from the logic circuits AND1, AND2, AND3, AND4 by combining logically the phase exciting signals (c), (d), (e), (f) each of which is shifted by 90 degrees with the overdrive signals.

Figure 5:
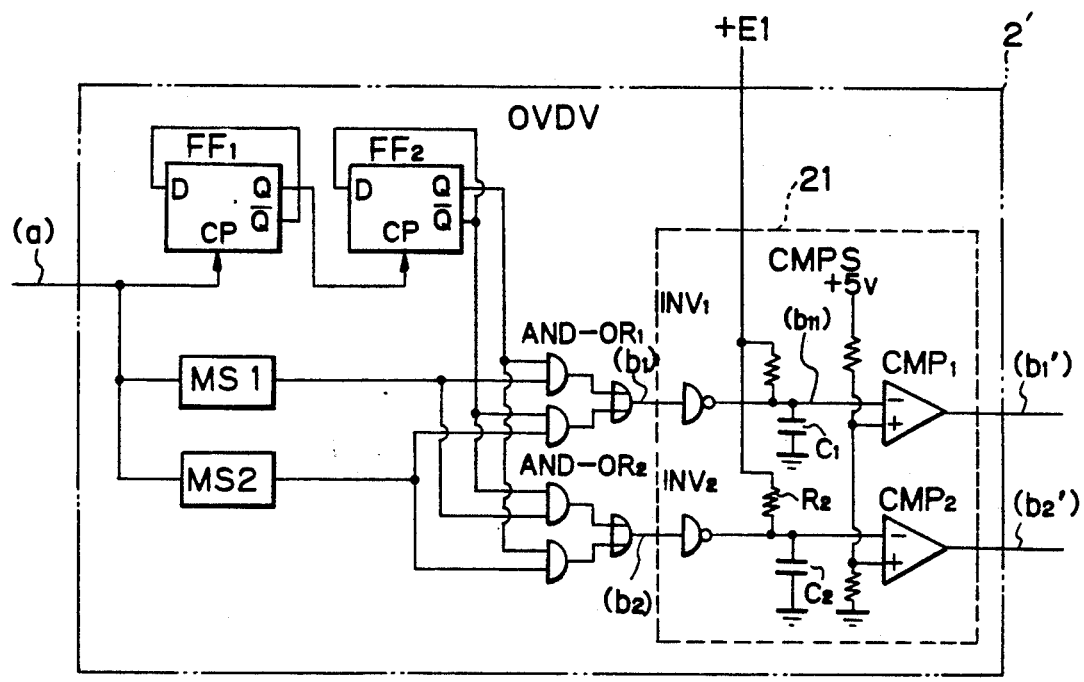
FIG. 5 is a circuit diagram of an overdrive signal generator employed in a drive circuit according to a second embodiment of the present invention.
Figure 6:
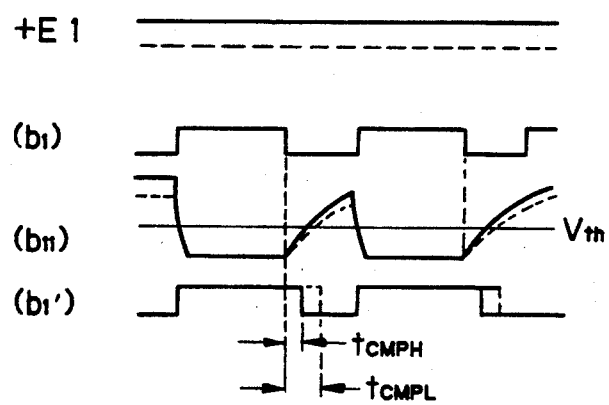
FIG. 6 is a timing chart showing an operation of the circuit of FIG. 5.

Second Embodiment (FIGS. 5 and 6)

A method of controlling a stepping motor according to a second embodiment of the present invention will be described with reference to FIGS. 5 and 6.

A drive circuit for the stepping motor is substantially the same as that of the first embodiment except that a compensating circuit is added to the overdrive signal generator of the first embodiment. The same components as those of the first embodiment are denoted with the same numerals and the explanations are omitted.

A compensating circuit CMPS(21) is connected to the output sides of AND-OR1 and AND-OR2. The compensating circuit CMPS(21) applies a compensation pulse to the pulse widths of the output signals (b1) and (b2) depending on the high or low level of the power source voltage +E1. If the power source voltage +E1 is high the compensation pulse width is short. If the power source voltage +E1 is low the compensation pulse width is long.

Accordingly, the compensating circuit CMPS(21) comprises, as illustrated in FIG. 5, inverters INV1 and INV2 of open collectors for regulating the polarities with the output signals (b1) and (b2), resistors R1 and R2 and capacitors C1 and C2 respectively arranged in series between the power supply voltage +E1 and the ground for delaying the rise time of the output signals (b11) of the inverters INV1 and INV2 depending on the high or low level of the power source voltage +E1.

The compensating circuit (21) operates by the comparators CMP1 and CMP2 comparing the charged capacitance voltages of the capacitors C1 and C2 with a reference voltage.

When the pulse of the overdrive signal (b1) goes high from low, as illustrated in the timing chart of FIG. 6, the output signal (b11) of the inverter INV1 goes low from the high level so that the voltage of the output signal (b11) becomes lower than a given reference voltage $V_{th}$. When the output signal is applied to a noninverting input of the comparator CMP1 the output signal (b1') produced by the comparator CMP1 goes high. If the overdrive signal (b1) goes low from high level, the output of the inverter INV1 goes high level from low level. In this case, when a charged capacitance voltage of the capacitor C1 connected to the power source voltage +E1 by way of the resistor R1 increases exponentially as illustrated in FIG. 6, the output signal (b11) in due time becomes higher than the reference voltage $V_{th}$ applied to the noninverting input of the comparator CMP1. The output signal (b1') of the comparator circuit CMP1 then goes low. That is, the compensation pulse tCMPH is added to the output signal (b1') of the comparator CMP1 by the compensating circuit CMPS 21 as illustrated by the solid line in FIG. 6.

If the power source voltage +E1 is low, the leading edge of the charged capacitance voltage applied to the output signal (b11) becomes gentle as illustrated by the broken line in FIG. 6 so that the compensation pulse $t_{CMPL}$, which is longer in the pulse width than the compensation pulse $t_{CMPH}$, is applied to the output signal (b1') of the comparator circuit CMP1.

Likewise, the compensating circuit CMPS(21) influences the overdrive signal (b2).

As a result, even if the power voltage is supplied by an unstable power supply, the driving or exciting current supplied to the phase windings of the stepping motor is controlled under an appropriate suppressed value depending on the power source voltage, thereby preventing the reduction of the torque caused by the overheating of the stepping motor.

Figure 7:
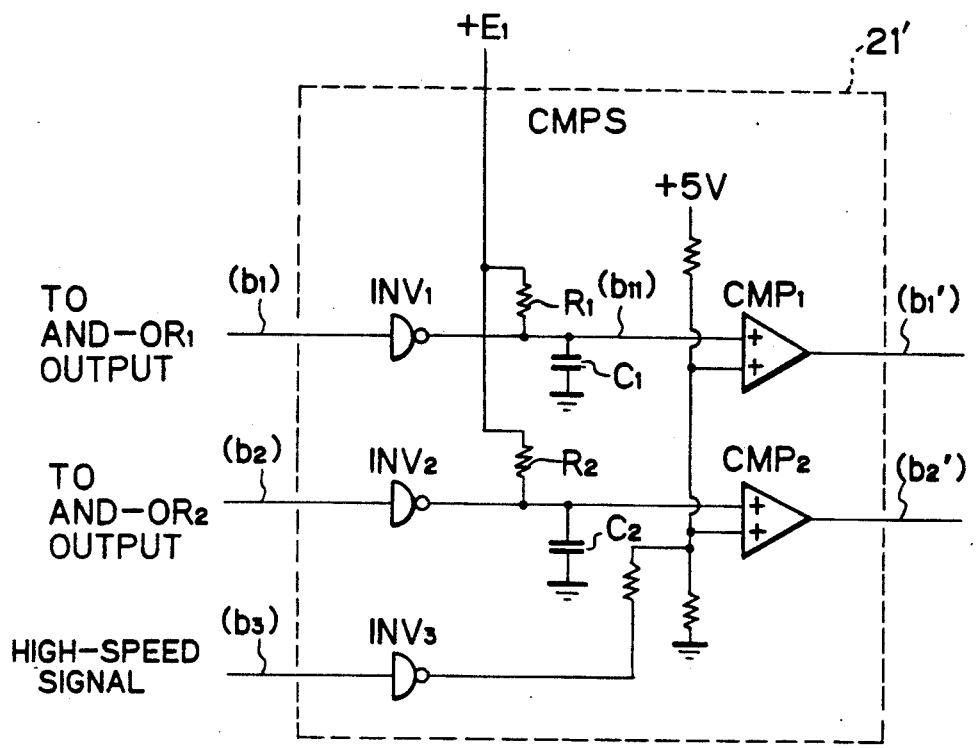
FIG. 7 is a circuit diagram of a compensating circuit employed in a drive circuit according to a third embodiment of the present invention.
Figure 8:
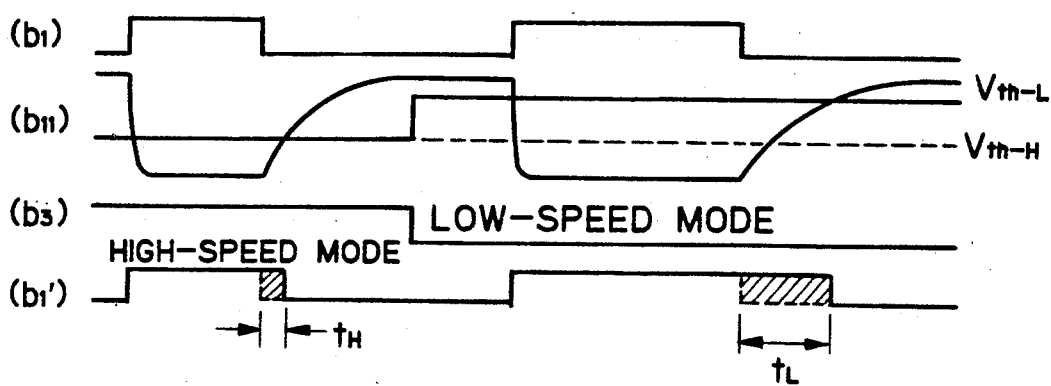
FIG. 8 is a timing chart showing an operation of the compensating circuit of FIG. 7.
Figure 9:
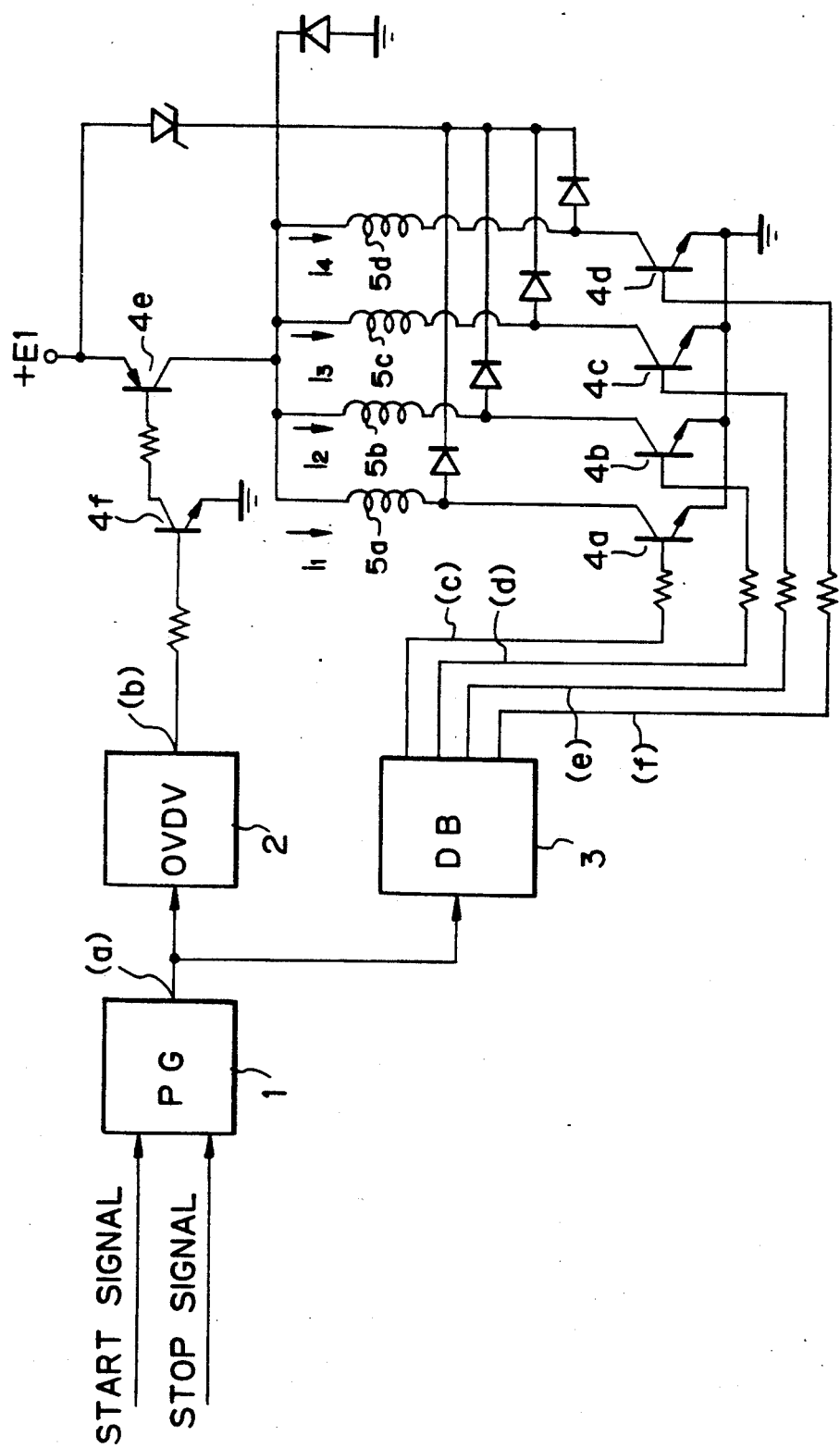
FIG. 9 is a circuit diagram of a drive circuit for a stepping motor of a related art.
Figure 10:
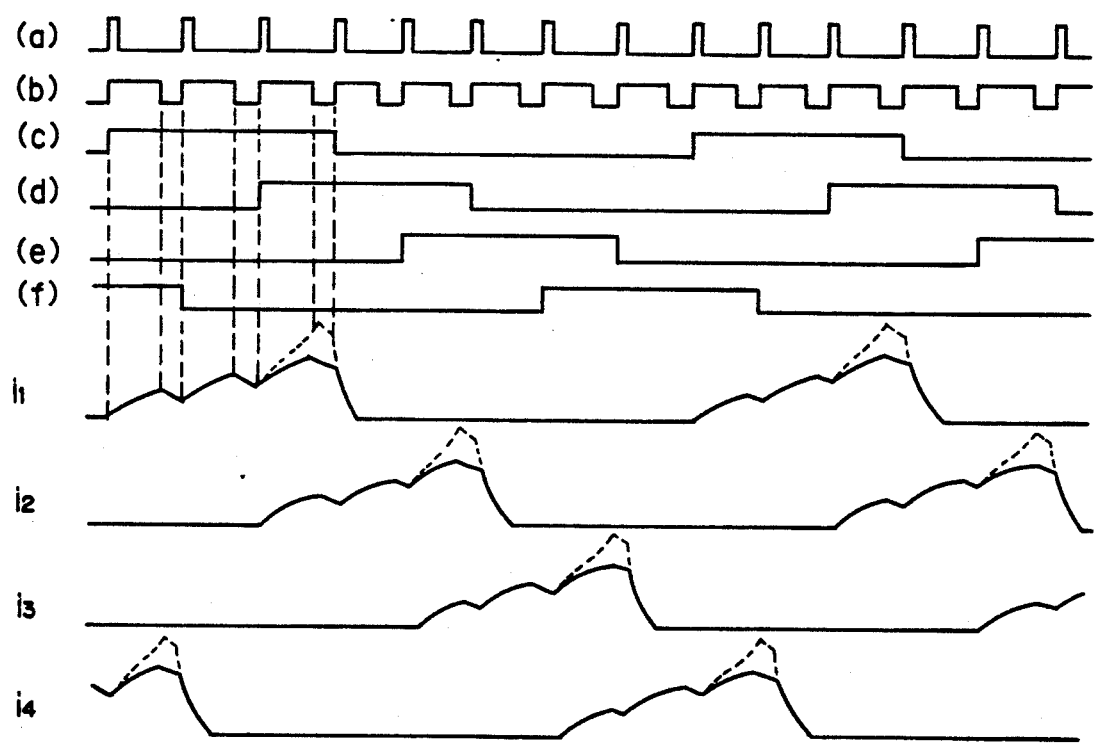
FIG. 10 is a timing chart showing an operation of the drive circuit of FIG. 9.

Third embodiment (FIGS. 7 and 8)

A method of driving a stepping motor according to a third embodiment of the present invention will be described with reference to FIGS. 7 and 8.

A drive circuit for the stepping motor is substantially the same as that of the second embodiment except that the compensating circuit further includes a third inverter INV3 connected to the noninverting inputs of the comparators CMP1 and CMP2 for varying the given reference voltage $V_{th}$ depending on the speed of rotation of the stepping motor.

If a high-speed mode instruction signal (b3) having a valve H is applied from a control unit, not shown, to the inverter INV3, the reference voltage applied to both the comparators CMP1 and CMP2 is lowered to the value $V_{th-H}$ thereby shortening the pulse width of the compensation pulse $t_H$ to be added to the output signals (b1') and (b2'). If the high-speed mode instruction, (b3) having a low valve is applied to the inverter INV3, the reference voltage is increased the value $V_{th-L}$ to thereby lengthen the pulse width of the compensation pulse $t_L$. Accordingly, it is possible to vary the compensation pulse to an appropriate value when the power voltage +E1 is unstable, thereby preventing the reduction of the torque caused by the overheating of the stepping motor.

Although the invention has been described in its preferred form with a certain degree of particularity, it is to be understood that many variations and changes are possible in the invention without departing from the scope thereof.

In another embodiment according to the present invention, the overdrive signals (b1) and (b2) may be input directly to the drive circuit without using the logic circuit comprising the AND gates which receives the exciting signals. In this case, the overdrive signal generator is designed so as to produce an overdrive signal containing a pulse with a longer width at an earlier stage of a pulse exciting duration during which a drive current flows in a phase winding of the stepping motor and a pulse with a shorter pulse width at a later stage of said exciting duration. Such a circuit configuration is suited to control unipolar stepping motors.

With the arrangement set forth above, it is possible to supply a sufficient amount of driving current to each phase winding at the rise time and to supply a small amount of driving current to each winding after the rise time, thereby preventing the reduction of the torque caused by the overheating of the stepping motor.

In this case, it is possible to reduce the generation of heat if the desired torque needs to be constant and increase the torque if the consumption power needs to be constant since the stepping motor is composed of a bipolar stepping motor.

The pulse widths of the overdrive signals are compensated according to the level of the power source voltage driving the stepping motor. That is, when the power voltage is high, the pulse widths of the driving signals are shortened to prevent the overcurrent. The pulse widths of a driving signals are lengthened to assure the satisfactory driving current. Even if the power source voltage is unstable, it is possible to maintain the driving current supplied to the phase windings at an appropriate value.

It is also possible to switch the compensation pulse that is added to the pulse width of the overdrive signal to a different valve depending on the speed of rotation of the stepping motor. The compensation pulse can be switched to a short pulse width in case the speed of revolution is high or to a long pulse width in case the speed of revolution is low. Accordingly, it is possible to regulate the compensation pulse at an appropriate value depending on the speed of revolution of the stepping motor even if the power source voltage is unstable.

What is claimed is:

1. A method of controlling a stepping motor comprising the steps of:
   producing a plurality of control signals by combining selectively a plurality of overdrive signals and a plurality of exciting signals, each of said plurality of overdrive signals being formed of a pulse with a longer width at an earlier stage of a phase exciting duration during which a drive current flows in said stepping motor and a pulse with a shorter pulse width at a later stage of said phase exciting duration; and
   supplying a drive current in said stepping motor during said phase exciting duration in response to said control signal.

2. A method of controlling a stepping motor according to claim 1 further comprising the step of controlling the pulse widths of said overdrive signals in response to a power source voltage applied to said stepping motor to compensate a torque of said stepping motor.

3. A method of controlling a stepping motor according to claim 1 further comprising the step of controlling the pulse widths of said overdrive signals in response to a revolution speed of said stepping motor to compensate a torque of said stepping motor.

4. A circuit for controlling a stepping motor including at least one phase winding comprising:
   a pulse generator for generating a pulse signal upon receipt of a start signal;
   an overdrive signal generator for generating a plurality of overdrive signals upon receipt of said pulse signal from said pulse generator, each of said plurality of overdrive signals being formed of a pulse with a longer width at an earlier stage of a phase exciting duration during which a drive current flows in said at least one phase winding and a pulse with a shorter width at a later stage of said phase exciting duration;
   a distributing circuit for generating a plurality of exciting signals upon receipt of said pulse signal from said pulse generator;
   a circuit for producing control signals by combining said plurality of overdrive signals and said plurality of exciting signals;
   a first switching circuit for supplying a drive current in a first direction to said at least one phase winding upon receipt of one of said control signals; and
   a second switching circuit for supplying said drive current in a second direction to said at least one phase winding upon receipt of another one of said control signals.

5. A method of controlling a stepping motor comprising the steps of:
   producing a plurality of overdrive signals, each of said plurality of overdrive signals being formed of a pulse with a longer width at an earlier stage of a phase exciting duration during which a drive current flows in said stepping motor and a pulse with a shorter pulse width at a later stage of said phase exciting duration; and
   supplying a drive current in said stepping motor during said phase exciting duration in response to said overdrive signals.

6. A method of controlling a stepping motor comprising the steps of:
   generating a plurality of control signals by combining selectively a plurality of overdrive signals and a plurality of exciting signals, each of said plurality of overdrive signals including pulses of long and short widths; and
   coupling a drive current to said stepping motor in response to said control signal.

7. A method of controlling a stepping motor according to claim 6 further comprising the step of coupling a drive current to said stepping motor in responsive to one of said exciting signals.

8. A method of controlling a stepping motor according to claim 6 further comprising the step of generating a plurality of overdrive signals responsive to a pulse signal.

9. A method of controlling a stepping motor according to claim 1 further comprising the step of coupling a drive current to said stepping motor in responsive to one of said exciting signals.

10. A method of controlling a stepping motor according to claim 1 further comprising the step of generating a plurality of overdrive signals responsive to a pulse signal.

11. A circuit for controlling a stepping motor according to claim 4 wherein said overdrive signal generator includes a counter, a plurality of output signal producers and a plurality of output signal switches whereby said counter and said plurality of output signal producers are coupled to a receive pulse signal and said plurality of output signal switches generate a plurality of overdrive signals.

12. A circuit for controlling a stepping motor according to claim 11 further comprising a compensating circuit including a polarity regulator/delay circuit and a plurality of comparators, said polarity regulator/delay circuit being coupled to said plurality of comparators and said plurality of overdrive signals, whereby said plurality of comparators generate a plurality of output signals.

13. A circuit for controlling a stepping motor according to claim 12 further comprising a reference voltage coupled to said plurality of comparators.

14. A circuit for controlling a stepping motor according to claim 13 further comprising a high-speed mode instruction signal coupled to said plurality of comparators whereby said high-speed mode instruction signal is responsive to the speed of said stepping motor.

15. A control circuit for a stepping motor comprising:
- a distributing circuit generating a plurality of exciting signals;
- an overdrive signal generator for generating a plurality of overdrive signals, each of said plurality of overdrive signals including long pulse widths and short pulse widths;
- a circuit for producing a plurality of control signals, said circuit being coupled to said distributing circuit and said signal generator; and
- a drive circuit responsively coupled to said circuit for producing a plurality of control signals, to couple a power source voltage to said stepping motor.

16. A control circuit as claimed in claim 15 further comprising a pulse generator for generating a pulse signal coupled to said overdrive signal generator and said distributing circuit.

17. A circuit for controlling a stepping motor according to claim 15 further comprising a compensating circuit including a polarity regulator/delay circuit and a plurality of comparators, whereby said polarity regulator/delay circuit is coupled to said plurality of comparators and said plurality of overdrive signals, whereby said plurality of comparators generate output signals.

18. A circuit for controlling a stepping motor according to claim 15 further comprising a reference voltage coupled to said plurality of comparators.

19. A circuit for controlling a stepping motor according to claim 18 further comprising a high-speed mode instruction signal coupled to said plurality of comparators whereby said high-speed mode instruction signal is responsive to the speed of said stepping motor.

20. A circuit for controlling a stepping motor according to claim 4 further comprising at least two further switching circuits for supplying respective drive currents in said first and second directions to at least another phase winding.

* * * * *